(12) United States Patent
Baron

(10) Patent No.: US 9,573,498 B2
(45) Date of Patent: Feb. 21, 2017

(54) PROTECTIVE PADDED SLEEVE FOR HIP RESTRAINTS ON GOLF CARTS

(71) Applicant: Innovative Accessories, LLC, Trophy Club, TX (US)

(72) Inventor: Dwight David Baron, Trophy Club, TX (US)

(73) Assignee: Innovative Accessories, LLC, Trophy Club, TX (US)

( * ) Notice: Subject to any disclaimer, the term of this patent is extended or adjusted under 35 U.S.C. 154(b) by 308 days.

(21) Appl. No.: 14/036,937

(22) Filed: Sep. 25, 2013

(65) Prior Publication Data

US 2014/0367949 A1 Dec. 18, 2014

Related U.S. Application Data

(60) Provisional application No. 61/834,717, filed on Jun. 13, 2013.

(51) Int. Cl.
*B60R 21/04* (2006.01)
*B60N 2/44* (2006.01)
*B60N 2/38* (2006.01)
*B60N 2/02* (2006.01)

(52) U.S. Cl.
CPC ............... *B60N 2/449* (2013.01); *B60N 2/38* (2013.01); *B60R 21/0428* (2013.01); *B60N 2002/0264* (2013.01)

(58) Field of Classification Search
CPC ....... B60R 21/0428; B60N 2/449; B60N 2/38; B60N 2002/0264
USPC ......... 280/748, 751, 756; 297/411.2, 411.21, 297/411.23, 411.26
See application file for complete search history.

(56) References Cited

U.S. PATENT DOCUMENTS

| 5,154,331 A | 10/1992 | Sanders |
| 5,332,288 A * | 7/1994 | Coates ................. B60N 2/4673 296/153 |
| 5,437,071 A * | 8/1995 | Feigenbaum ........ A47D 15/008 248/345.1 |

(Continued)

FOREIGN PATENT DOCUMENTS

WO 2011044429 4/2011

OTHER PUBLICATIONS

Daniel S. Watson, BS; Tracy J. Mehan, MA; Gary A. Smith, MD, DrPH; Lara B. Mckenzie, PhD, MA, Golf Cart-Related Injuries in the U.S., American Journal of Preventive Medicine, vol. 35, Issue 1, pp. 55-59, Jul. 2008.

*Primary Examiner* — Toan To
(74) *Attorney, Agent, or Firm* — Locke Lord LLP

(57) ABSTRACT

The present invention relates generally to protective padding for golf carts, and more specifically, the invention relates to a protective padded sleeve that comprises a sleeve, a fastener and padding, which is placed over and around the hard plastic hip restraint of a golf cart to prevent a rider from being injured. When a rider sits on the bench-style seat of a golf cart, the rider's hip and leg are in contact with this hip restraint. The invention operates by both absorbing the shock with padding placed between a rider and the hard plastic hip restraint of a golf cart, as well as, completely enclosing the hip restraint to prevent obstacles from protruding through the large opening in the hip restraint and causing injury to the rider. This invention further incorporates an auxiliary power source for wireless devices, a wireless speaker and accessory holders.

28 Claims, 5 Drawing Sheets

(56) References Cited

U.S. PATENT DOCUMENTS

| | | | | |
|---|---|---|---|---|
| 5,605,374 | A | * | 2/1997 | Perry .................... A47C 7/546 |
| | | | | 297/227 |
| D398,173 | S | * | 9/1998 | Velez ........................... D6/601 |
| 6,401,281 | B1 | * | 6/2002 | Younge ................ A47C 21/08 |
| | | | | 5/425 |
| 6,578,914 | B2 | * | 6/2003 | Artsvelyan .......... B60N 2/4673 |
| | | | | 297/219.1 |
| 6,604,789 | B1 | * | 8/2003 | Downing ............... A47C 7/546 |
| | | | | 297/227 |
| 6,827,405 | B1 | * | 12/2004 | Roberts .................. A47C 7/546 |
| | | | | 297/188.18 |
| D540,606 | S | * | 4/2007 | Greenberg .................... D6/604 |
| 7,431,396 | B1 | * | 10/2008 | Dasso .................... A47C 7/546 |
| | | | | 297/227 |
| 8,695,168 | B1 | * | 4/2014 | Cepeda .................... B25G 1/10 |
| | | | | 16/413 |
| D729,692 | S | * | 5/2015 | Baron ........................... D12/16 |
| 2007/0228711 | A1 | * | 10/2007 | Hanson .................. B60N 2/449 |
| | | | | 280/748 |
| 2011/0193372 | A1 | | 8/2011 | Pizzuto |

\* cited by examiner

PROTECTIVE PADDED SLEEVE FOR HIP RESTRAINTS ON GOLF CARTS

CROSS REFERENCE TO RELATED APPLICATIONS

This application claims the benefit of U.S. Provisional Patent App. No. 61/834,717 filed Jun. 13, 2013.

BACKGROUND OF THE INVENTION

1. Field of the Invention

The present invention relates generally to a protective padded sleeve for golf carts that provides protection from injury, added comfort to the riders, is capable of holding accessories and enhances the golf carts appearance. More specifically, the invention relates to a protective padded sleeve that comprises a sleeve, a fastener and padding, which is permanently placed over and around the hip restraint of a golf cart to prevent a rider from being injured when contacting the hip restraint or from protruding obstacles that could penetrate the large opening in the center of the hip restraint.

2. Description of Related Art

The sport of golf and recreational use of golf carts has developed into a billion dollar industry throughout the world. Currently, there are approximately 4,500 private golf courses with over 3.6 million golf carts and approximately 11,500 public and municipal courses with over 8 million golf carts in just the United States alone. A typical round of golf lasts approximately 4 hours, and players must navigate a golf course's approximate 4.5 mile length, which usually includes both hilly and rough terrain. As such, on most courses golf carts have become an essential part of the game. In addition, golf carts are now routinely used for transportation purposes at sporting events, hospitals, airports, national parks, college campuses, military bases and many businesses. In retirement communities, golf carts have become the primary means of transportation. The number of golf carts used for transportation in these other areas outside of golf is estimated to exceed 10 million.

As golf carts are used in more settings both on and off the golf course, the number of documented injuries has risen. According to an article in the July 2008 issue of the *American Journal of Preventive Medicine*, from 1990 until 2006, the injury rate rose more than 130 percent. During this period, nearly 150,000 golf cart-related injuries were recorded in people as young as 2 months and as old as 96 years. In a 2010 study and publication, according to the Consumer Products Safety Commission (CPSC), there are approximately 15,000 golf cart related injuries requiring emergency room treatment in the US each year. Soft tissue damage and severe bruising accounted for 47.7% of all injuries. Contusions and abrasions were the most common diagnosis for the hip and lower extremity region. In addition to operating the cart, getting into or out of a cart was noted as one of the main causes of injury.

The current design of golf carts has evolved over the past ten years and the metal tubular arm rests on prior carts has been replaced with hard plastic hip restraints. These hip restraints now installed on both sides of the carts bench-style seat are irregularly shaped with an open center. These hip restraints serve multiple purposes. First, the hip restraints prevent riders from sliding off the bench-style seat. Second, in addition to the handle provided on the carts roof, these hip restraints serve as a handle when the passengers are entering or exiting the cart. Third, they serve to act as a handle for lifting the seat, for providing access to the battery compartment under the seat for maintenance of the golf cart.

The typical hip restraints on current golf carts are made of a solid one-piece forged hard plastic material in a substantially irregular, but generally triangular shape with an open center. The typical golf cart bench-style seat is approximately 39 inches wide, which makes it a very confining space for two average sized adult riders. This makes it very likely for the rider's hip and upper leg to be in constant contact with the hard plastic hip restraint during the normal operation of the golf cart. As evidenced by the annual number of injuries, this hard plastic hip restraint is both uncomfortable and is prone to cause bruising and contusions to a rider when entering or exiting the cart or during normal operation when turns are made or when the golf cart traverses over rough terrain. This can especially be a problem for people with a history of hip problems or older riders, which make up a large percentage of both golfers and residents in retirement communities where golf carts have become the primary means of transportation. In addition, the large opening in the center of the hip restraint allows for obstacles such as tree limbs to penetrate through the hip restraint and cause injury to the rider.

Many accessories have become an integral part of the game of golf such as balls, tees, brushes, markers, sunglasses, and more recently GPS systems, wireless mobile devices, wireless devices for playing music, wireless speakers and other accessories that golfers like to have ready access to when they are either riding in the golf cart or outside of the cart looking for or preparing to hit their ball. Other users of carts also want to have easy access to important accessories they regularly carry. Although carts have an open area in the front interior for storing accessories, these storage areas have become insufficient in view of the ever-increasing number and types of accessories that are used on the golf course or in the many other uses of golf carts. These existing storage areas are especially inefficient for certain items that a golfer or other users of carts regularly use such as wireless communication devices and wireless speakers. In the carts front storage areas these type devices are hard to reach, exposed to significant shock and vibration and prone to damage or bouncing out of the cart when hitting bumps or rough terrain. Additionally, because rounds of golf generally take at least four hours, most players need or desire to have convenient and frequent access to their wireless communications devices. Current cart designs do not offer a convenient and safe place for all users of carts to keep these type devices and other valuable items that they would prefer to have in an easily accessible and secure place.

Most golf carts do not have any power source for accessories such as wireless communication devices, devices for playing music and wireless speakers, especially those at Private and Public Golf Courses. A power source is not typically provided in the golf cart due to the adverse effect it would have on the very expensive batteries that are used to power most golf carts. Due to the typical round of golf lasting approximately 4 hours it is desirable for golfers and other users of golf carts to have alternative back-up sources of power for these devices, so that while golfing or using the cart they do not lose the use of these devises due to loss of battery power. This is especially true with wireless communication devices that need to be available in case of an emergency or if a golf cart users profession is such that of a physician where they must be on-call 24 hours a day.

It is therefore desirable to have a protective padded sleeve that is permanently secured and completely covers and is tightly secured to the hip restraint. The protective padded sleeve has substantial firm padding on the exterior side to provide adequate protection for the riders hip and leg from obstacles protruding through the opening in the hip restraint and substantial foam-like padding on the interior and top side to provide cushioning for the passenger's hip, leg and arm for the purpose of eliminating injuries from contact with the hip restraint while also significantly improving the comfort of riding in a golf cart. The protective padded sleeve still allows the hip restraint to perform its other intended functions of serving as a handle for riders to grasp and as a handle for lifting the seat. The protective padded sleeve also integrates a back-up source of power for electronic devices, a wireless speaker for listening to music and a holder for storing accessories, which increases the space for carrying additional accessories in a golf cart.

SUMMARY OF THE INVENTION

The present invention provides generally for a protective padded sleeve for permanent placement to cover and enclose the hip restraint that serves to protect a golf cart rider from injury and provide greater comfort during the operation of the cart. The protective padded sleeve is shaped to fit precisely over the hip restraint and completely encloses the hip restraint on the top and both sides. The design of the protective padded sleeve to completely enclose the hip restraint is a very important element in providing protection for the rider from tree limbs and other obstacles that could otherwise penetrate the open area of the current hip restraints and cause injury to the rider. The design of the protective padded sleeve also utilizes the open area of the hip restraint between the interior side facings softer padding and the exterior side facings firmer padding for the installation of a power source for wireless electronic devices and wireless speakers for music as an additional embodiment of the invention.

The protective padded sleeve includes a fastener for attaching it to the hip restraint on the hip restraints less accessible bottom side. The protective padded sleeve includes padding on the portions of the sleeve that contacts the top and interior side of the hip restraint, which are the portions of the hip restraint that come into contact with the hip, leg and arm of a person riding in the cart. This padding prevents the rider from being injured when his or her hip, leg or arm hits against the interior and top sides of the hip restraint. This interior and top side padding is made of a soft and pliable open-celled material that absorbs shock as opposed to the hard plastic material of the current hip restraint. The portion of the sleeve that contacts the exterior side of the hip restraint has a sturdy closed-cell material, for preventing obstacles and objects such as tree limbs from penetrating the current hip restraints opening and causing injury to the occupant, as well as, provides for a harder surface for the installation and mounting of an auxiliary power source for wireless devices and wireless speakers while also giving the golf cart a sleeker and more streamlined design.

Because the hip restraint serves functions other than to keep the rider in the golf cart during use, any protective sleeve that fits over the hip restraint must allow a rider or user to wrap his or her fingers around the top portion of the hip restraint in order for the hip restraint to retain its function as an additional handle when entering or exiting the cart. Because of the narrowness of the current invention across the top, the golf cart rider can still grip the handle. In an additional embodiment, the protective padded sleeve's design provides a gripping surface for the rider or user to grasp the hip restraint. The protective padded sleeve also is UV-rated and heat resistant, thus cooler to the touch than the typically black hard plastic hip restraints, which can get very hot when the cart sits for long periods in the sun or during long rounds of golf typically played in sunshine with high temperatures. The protective padded sleeve is also mildew and stain resistant and protects the cart user from stains and excessive wear on their clothing that the current black hip restraints are prone to cause.

In a further additional embodiment, the protective padded sleeve further includes a power source and inlet for plugging in wireless communication devices. This power source may in some designs be rechargeable or solar powered. Having a back-up power source for important devices such as cell phones has become necessary due to the length of time it takes to play a round of golf or in other uses of the golf cart. The open area in the center of the hip restraint between the interior and exterior side padding provides for this type of device to be installed on the exterior facing of the padded protective sleeve on both the driver and passenger's side of the golf cart.

In a further additional embodiment, the protective padded sleeve further includes a wireless speaker for listening to music. Listening to music has become increasingly popular with users of carts while riding in the golf cart both on and off the golf course. The open area in the center of the hip restraint between the interior and exterior side padding provides for this type of device to be installed on the exterior facing of the padded protective sleeve on both the driver and passenger's side of the golf cart.

In a further additional embodiment, the protective padded sleeve includes a holder or holders for accessories, which is needed due to the increase in the number of accessories that golfers and other users of carts now use. The holder for golf accessories can be specifically shaped to hold a specific item, such as a cell phone, a wireless device for playing music or golf balls. Alternatively, the holder for golf accessories can be more of a generally-shaped pocket or compartment with a zipper type closure for holding any items, such as wireless communication devices, a wallet, watch, rings or other items that any cart user may want to temporarily store in a secure location. A combination of specifically-shaped holders and generally-shaped holders could also be used.

The novel features and construction of the present invention, as well as additional objects thereof, will be understood more fully from the following description when read in connection with the accompanying drawings.

BRIEF DESCRIPTION OF THE DRAWINGS

The invention is further described and explained in relation to the following figures of the drawings wherein.

Like reference numerals are used to describe like parts in all figures of the drawings.

DESCRIPTION OF THE PREFERRED EMBODIMENTS

Figure 1:
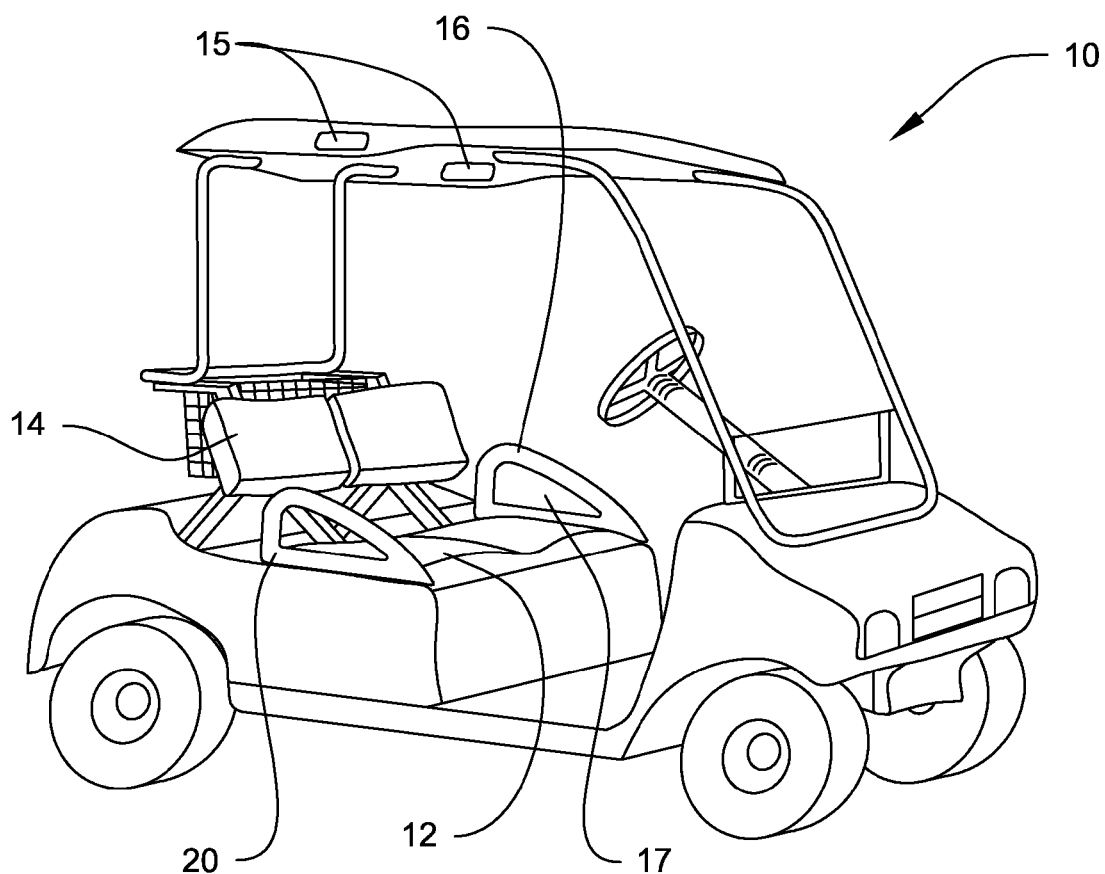
FIG. 1 is a side view of a prior art golf cart without the protective padded sleeve attached to the hip restraint.
Figure 2:
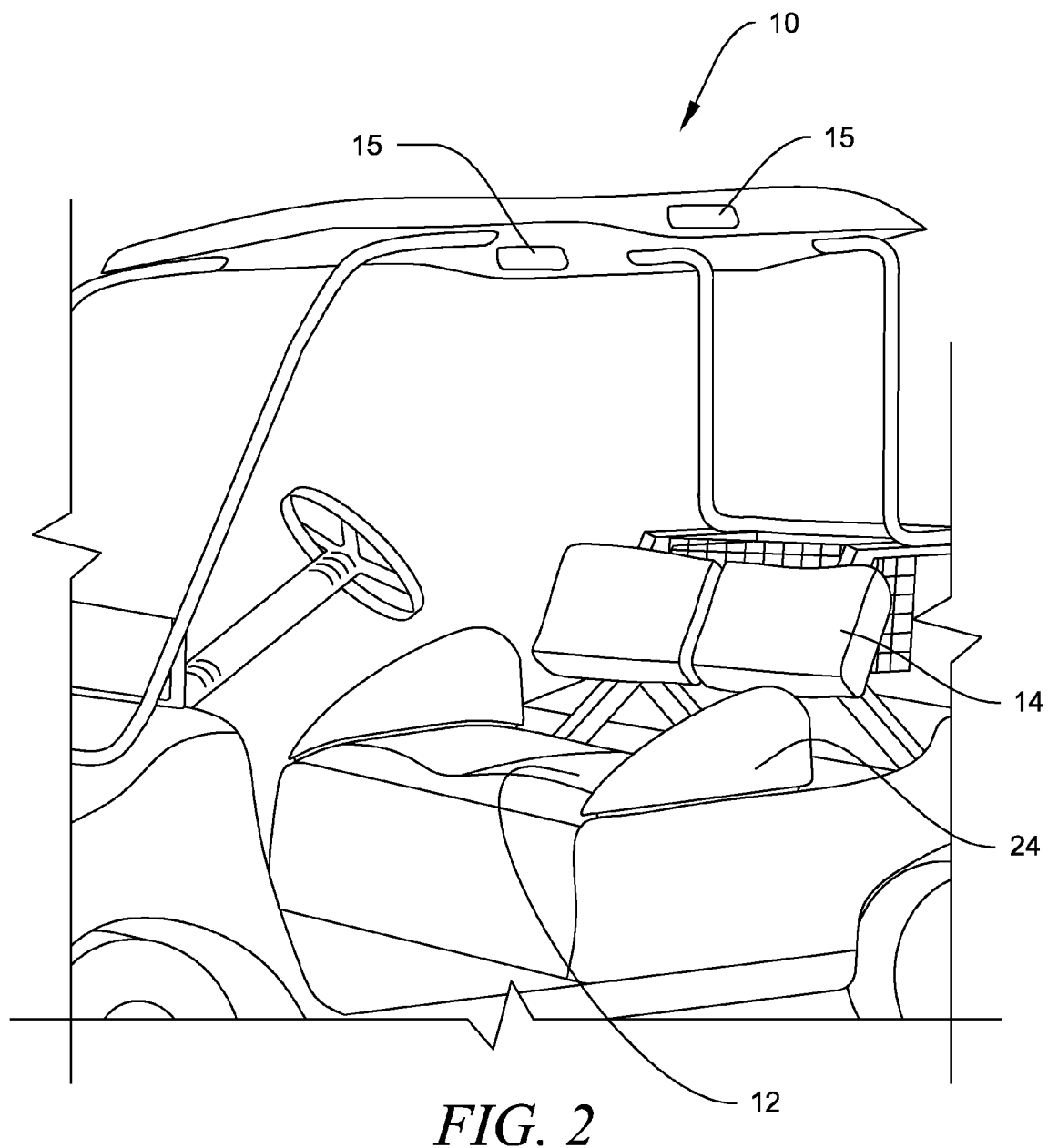
FIG. 2 is a perspective view of a golf cart and a protective padded sleeve placed over the hip restraint of the golf cart.

Referring to FIGS. 1 and 2, golf cart 10 is shown with seat 12, backrest 14, hip restraint 16 and roof handle holes 15. Hip restraints 16 have open area 17 and are attached to golf cart 10 by attachment bolts at the bottom of seat 12. When seat 12 is placed down in its normal operating position, bottom bar 20 of hip restraint 16 is parallel to the ground. Hip restraint 16 is operable as a handle to raise seat 12 using a set of hinges on the forward facing side of seat 12. Referring to FIG. 2, golf cart 10 is shown with protective padded sleeve 24 installed over the hip restraint 16. Protective padded sleeve 24 covers hip restraint 16 in its entirety when protective padded sleeve 24 is installed. Protective padded sleeve 24 completely covers open area 17 which adds additional protection from tree branches or other foreign objects protruding through open area 17 in hip restraint 16 and causing injury to the golf cart rider.

Figure 3:
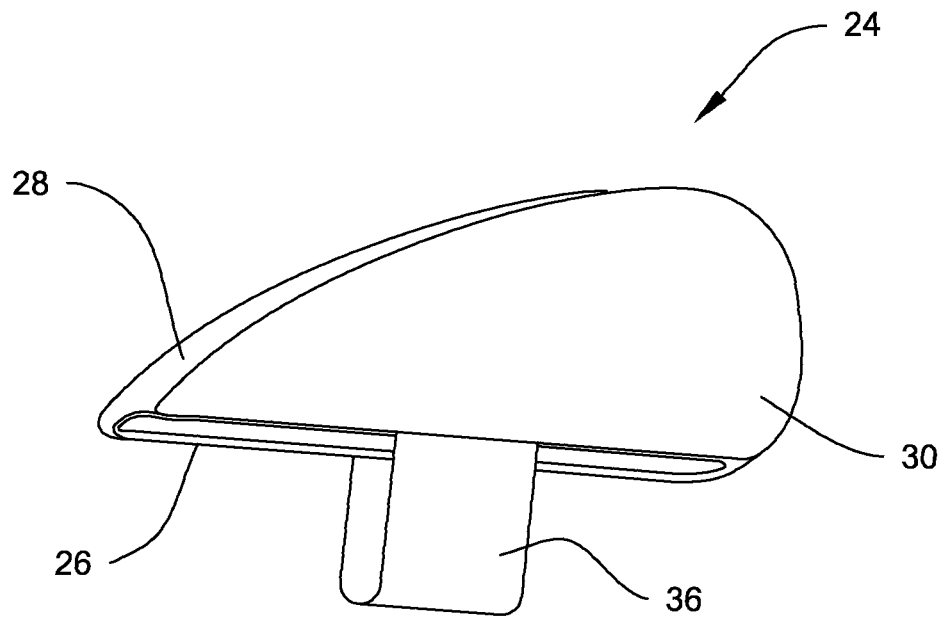
FIG. 3 is a side view of the protective padded sleeve as seen from the interior side of the invention.
Figure 4:
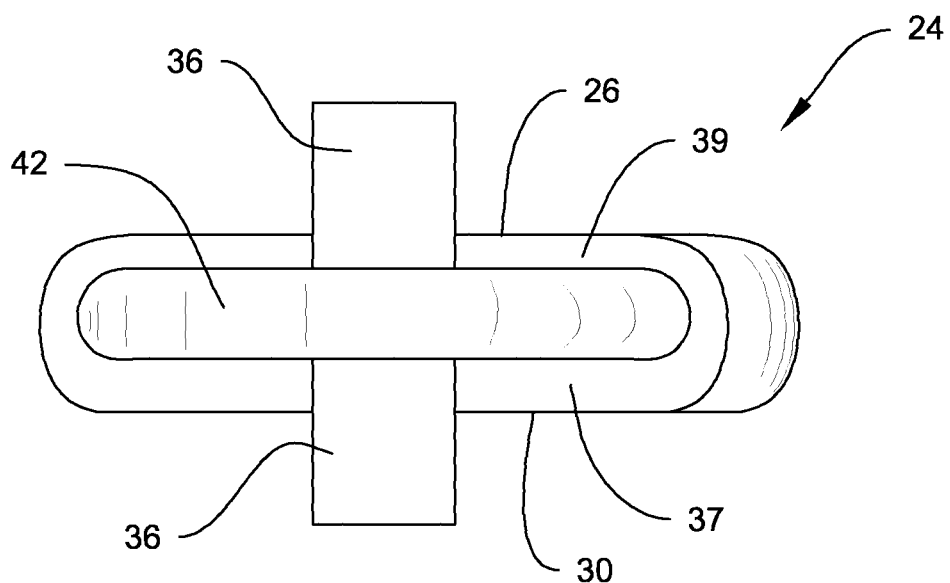
FIG. 4 is a bottom view of the protective padded sleeve.

Referring to FIG. 3, protective padded sleeve 24 is attached to hip restraint 16 by a fastening system 36 that attaches protective padded sleeve 24 to bottom bar of hip restraint (not shown) in a permanent fashion. Protective padded sleeve 24 has exterior facing side 26, top side 28 and interior facing side 30. Protective padded sleeve 24 is shown in FIG. 3 from the view of interior facing side 30. In this embodiment, fastener 36 extends from the bottom of interior facing side 30 and exterior facing side 26. Referring to FIG. 4, protective padded sleeve 24 is shown from a bottom view. When not attached to hip restraint 16, fastener 36 has a section that is attached to exterior facing side 26 and a section that is attached to interior facing 30. When used to secure protective padded sleeve 24 to hip restraint 16 (as shown in FIG. 2), one portion of fastener 36 can be secured to the other portion by the use of a hook and loop mechanism, a zipper, a clasp or snap mechanism. Visible from the bottom view is interior compartment 42 of protective padded sleeve 24. Enclosed inside interior facing side 26 and top side 28 of protective padded sleeve 24 is padding 37 that is made of a shock absorbing material, and padding 37 can absorb the impact between a rider's hip, leg or arm and the hard material of hip restraint 16. In the preferred embodiment, interior padding 37 is comprised of one inch thick open cell foam. In the preferred embodiment, one inch thick open cell foam is also underneath top side 28 of padded sleeve 24. In the preferred embodiment, placed inside exterior facing side 26 is ½" thick hard and sturdy closed cell foam 39 that can prevent objects from protruding through opening 17 of hip restraint 16 and causing injury to the rider as well as providing a harder surface for the installation and mounting of a power source for wireless electronic devices and wireless speakers as discussed below.

Figure 5:
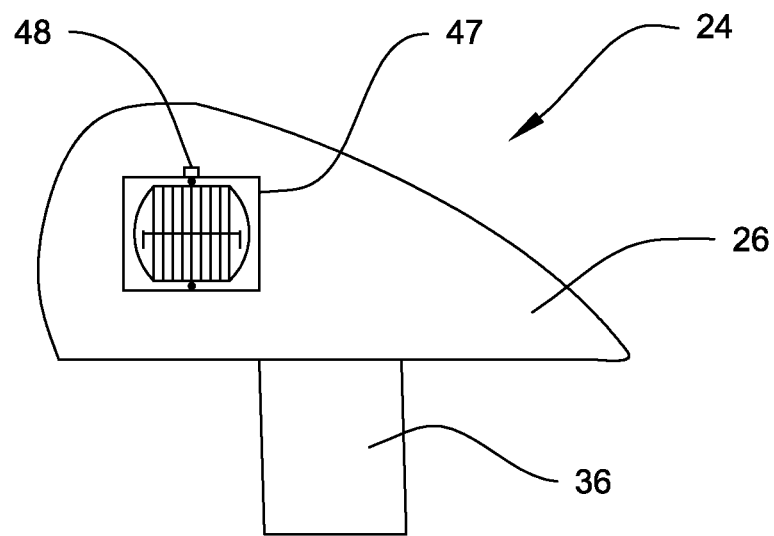
FIG. 5 is a side view of an alternative embodiment of the protective padded sleeve as seen from the exterior side of the invention incorporating an alternative power source for electronic devices.

Referring to FIG. 5, an alternative embodiment of protective padded sleeve 24 is shown incorporating alternative power source 47 and inlet 48 for sourcing power on exterior facing side 26. This alternative power source may be rechargeable or solar powered and is capable of providing a back-up power source for wireless communication devices, as well as, other electronic devices that are commonly used in golf carts.

Figure 6:
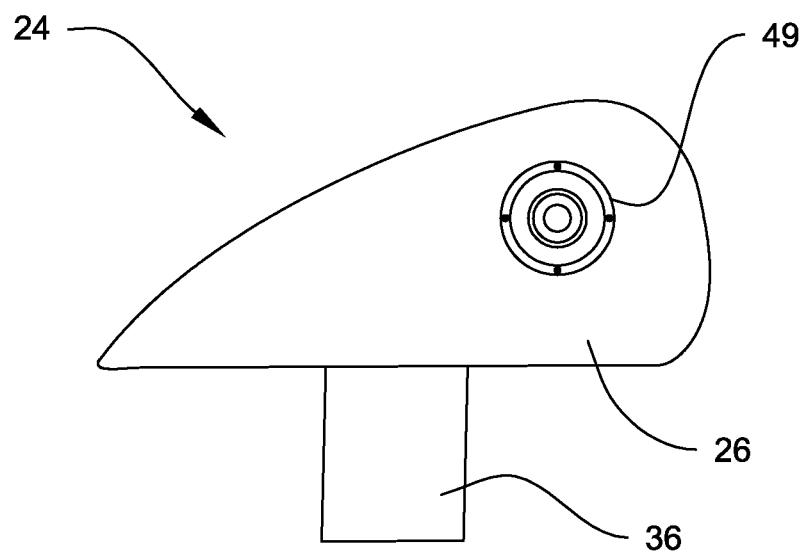
FIG. 6 is a side view of an alternative embodiment of the protective padded sleeve as seen from the exterior side of the invention incorporating a wireless speaker for listening to music.

Referring to FIG. 6, an alternative embodiment of protective padded sleeve 24 is shown incorporating wireless speaker 49 on exterior facing side 26. This wireless speaker 49 is capable of playing music from other wireless devices which has become increasingly desirable amongst golfers and other users of golf carts.

Figure 7:
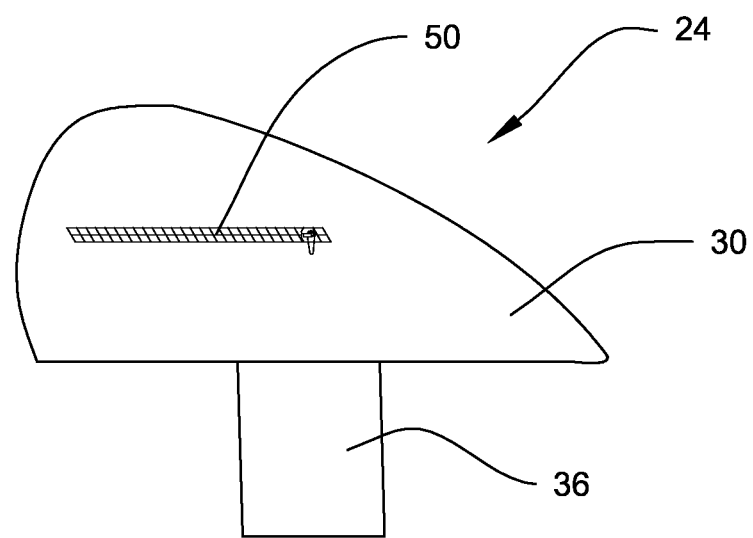
FIG. 7 is a side view of an alternative embodiment of the protective padded sleeve as seen from the interior side of the invention incorporating a pocket for accessories.
Figure 8:
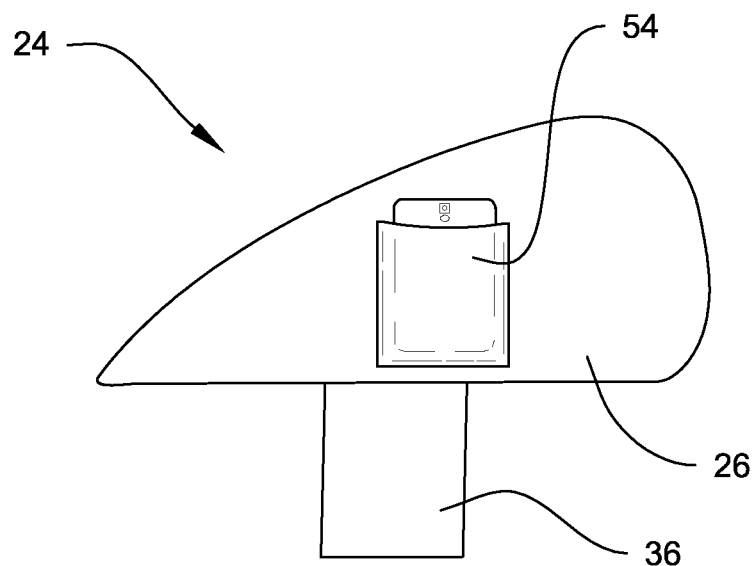
FIG. 8 is a side view of an alternative embodiment of the protective padded sleeve as seen from the exterior side of the invention incorporating an accessory holder.

Referring to FIGS. 7 and 8, alternative embodiments of padded sleeve 24 are shown incorporating general use pocket 50 on interior side 30 and cell phone holder 54 on exterior facing side 26. The general use pocket is capable of holding a user's wireless communication device, wallet, watch, rings, GPS finder or the like. In this embodiment, general use pocket 50 is closed with a zipper, but any means of providing secure closure could be used.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

The invention claimed is:

1. A protective padded sleeve for use with an open hip restraints on a cart, comprising:
   a sleeve having a plurality of sides, the sides comprising an interior-facing side; an exterior-facing side and a top side;
   a padding operable to protect the rider from injury;
   a fastener operable to secure the sleeve to the open hip restraint;
   wherein the sleeve substantially covers the open hip restraint when secured to the open hip restraint.

2. The protective padded sleeve of claim 1 further comprising an accessory holder.

3. The protective padded sleeve of claim 2 wherein the accessory holder is a golf ball holder.

4. The protective padded sleeve of claim 2 wherein the accessory holder is a tee holder.

5. The protective padded sleeve of claim 2 wherein the accessory holder is a pocket.

6. The protective padded sleeve of claim 5 wherein the pocket has a zipper closure.

7. The protective padded sleeve of claim 2 wherein the accessory holder is a cell phone holder.

8. The protective padded sleeve of claim 1 wherein the padding is a gel-like shock absorbent material.

9. The protective padded sleeve of claim 1 wherein the padding is a foam-like shock absorbent material.

10. The protective padded sleeve of claim 1 wherein the padding is a dense penetration-resistant material.

11. The protective padded sleeve of claim 1 further comprising a power source and power outlet.

12. The protective padded sleeve of claim 11 wherein the power source is a rechargeable battery.

13. The protective padded sleeve of claim 11 wherein the power source is solar-activated.

14. The protective padded sleeve of claim 11 further comprising a wireless speaker.

15. A protective padded sleeve for use with a hip restraint on a cart, comprising:

a sleeve having a plurality of sides, the sides comprising an interior-facing side; an exterior-facing side and a top side;

a padding operable to protect the rider from injury;

a fastener operable to secure the sleeve to the hip restraint;

wherein the sleeve substantially covers and encloses the hip restraint when secured to the hip restraint.

16. The protective padded sleeve of claim 15 further comprising an accessory holder.

17. The protective padded sleeve of claim 16 wherein the accessory holder is a golf ball holder.

18. The protective padded sleeve of claim 16 wherein the accessory holder is a tee holder.

19. The protective padded sleeve of claim 16 wherein the accessory holder is a pocket.

20. The protective padded sleeve of claim 19 wherein the pocket has a zipper closure.

21. The protective padded sleeve of claim 16 wherein the accessory holder is a cell phone holder.

22. The protective padded sleeve of claim 15 wherein the padding is a gel-like shock absorbent material.

23. The protective padded sleeve of claim 15 wherein the padding is a foam-like shock absorbent material.

24. The protective padded sleeve of claim 15 wherein the padding is a dense penetration-resistant material.

25. The protective padded sleeve of claim 15 further comprising a power source and power outlet.

26. The protective padded sleeve of claim 25 wherein the power source is a rechargeable battery.

27. The protective padded sleeve of claim 25 wherein the power source is solar-activated.

28. The protective padded sleeve of claim 15 further comprising a wireless speaker.

* * * * *